United States Patent [19]

Haaf et al.

[11] Patent Number: 4,477,627

[45] Date of Patent: Oct. 16, 1984

[54] GEL IMPACT MODIFIED POLYCARBONATE RESIN COMPOSITIONS

[75] Inventors: William R. Haaf, Voorheesville; Gim F. Lee, Jr., Albany, both of N.Y.; Glenn D. Cooper, deceased, late of Delmar, NY, by Rose H. Cooper, executrix

[73] Assignee: General Electric Company, Mt. Vernon, Ind.

[21] Appl. No.: 545,885

[22] Filed: Oct. 27, 1983

[51] Int. Cl.$^3$ ............................................. C08L 69/00
[52] U.S. Cl. ........................................ 525/67; 525/70; 525/146; 525/147; 525/148
[58] Field of Search ................. 525/67, 146, 147, 148; 528/176, 196; 260/709

[56] References Cited

U.S. PATENT DOCUMENTS 4,101,504 7/1978 Cooper et al. ...................... 524/411
4,172,103 10/1979 Serini et al. ........................... 525/77

Primary Examiner—Theodore E. Pertilla
Attorney, Agent, or Firm—Martin B. Barancik

[57] ABSTRACT

The impact strength of unsubstituted aromatic polycarbonate resins is improved by inclusion of certain gel materials with the resin before molding. The gel additive can be derived from a rubber modified alkenyl aromatic resin, is in the form of rubbery particles comprised of rubber, rubber grafted alkenyl aromatic resin and occluded alkenyl aromatic resin, and is substantially free of all but trace amounts of soluble alkenyl aromatic homopolymer.

17 Claims, No Drawings

GEL IMPACT MODIFIED POLYCARBONATE RESIN COMPOSITIONS

The present invention relates to thermoplastic molding compositions based on an aromatic polycarbonate resin and a rubber modified alkenyl aromatic gel.

BACKGROUND OF THE INVENTION

Although the impact resistance of polycarbonate resins, and especially aromatic polycarbonate resins, is generally thought to be good, the sensitivity of such resins to thickness in Izod impact tests is well known. For instance, notched Izod values for a one-eighth inch thick section of molded polycarbonate can be in excess of 16 ft.lbs/in., but only several ft.lbs/ in. for a one-quarter inch section.

It has been proposed that this thickness sensitivity can be reduced by adding a small amount of a polyolefin, e.g., polyethylene, to the polycarbonate resin. While the addition of polyethylene has proven to be somewhat effective, in the main thick section notched Izod strengths are still not comparable to thin section strengths.

Serini, et al, in U.S. Pat. No. 4,172,103, discloses thermoplastic molding compositions of an aromatic polycarbonate, a thermoplastic resin and a modified or unmodified rubber. The polycarbonate resin contains at least 50 percent of tetraalkyl substituted structural units; the thermoplastic resin can be, for example, polystyrene; and the rubber can be, for example, ethylene-propylene-diene rubber, among others. These compositions are described as being very homogeneous and as characterized by a number of improved properties, including high stability to saponification, good notched and unnotched impact strength and high stress cracking resistance.

INTRODUCTION TO THE INVENTION

It has now been discovered that the addition of certain gel materials containing rubber grafted alkenyl aromatic resin but substantially devoid of extractable alkenyl aromatic homopolymer, to certain aromatic polycarbonates results in a composition which, when molded in thick sections, possesses improved Izod impact strength. In this regard the gel additive of this invention is much more effective, on a weight for weight basis, than polyethylene or other polyolefins heretofore employed. Moreover, the present compositions exhibit excellent Gardner impact strength and do not manifest a tendency to undergo delamination.

The polycarbonate resins of the present kind of compositions contain, in contrast to those of Serini, et al., above, virtually no o,o,o',o'-tetraalkyl substituted aromatic units, but rather are essentially unsubstituted.

The gel additive is in the form of rubbery particles comprising rubber, rubber grafted alkenyl aromatic resin and occluded alkenyl aromatic resin, and contains none or only trace amounts of solvent extractable (i.e., free) alkenyl aromatic homopolymer.

DESCRIPTION OF THE INVENTION

The invention comprises a thermoplastic molding composition of (a) an unsubstituted aromatic polycarbonate resin, and (b) a gel material comprised of rubbery particles, rubber grafted alkenyl aromatic resin and occluded alkenyl aromatic resin, said gel material being substantially free of solvent extractable alkenyl aromatic homopolymer (e.g., no more than about 2 weight percent).

The terminology "unsubstituted aromatic polycarbonate resin" is used herein to refer to polymers containing no substituents on the aromatic rings in the polymer chain. Preferably, the polycarbonate resin contains a predominating amount of recurring units of the formula

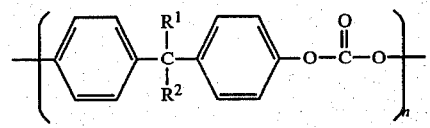

wherein $R^1$ and $R^2$ are, independently, hydrogen, (lower) alkyl, halogen substituted (lower) alkyl or phenyl; and n represents the total number of monomer units and is an integer at least about 30, and more usually, from 40 to 400 or higher. The term "(lower, alkyl" is intended to mean a straight or branched alkyl group having from 1 to about 10, and more frequently, from 1 to about 6 carbon atoms, for example, methyl, ethyl, propyl, butyl, pentyl, hexyl, octyl, nonyl, decyl, isopropyl, isobutyl, trimethyl, ethyl methyl, and so forth. Preferably, $R^1$ and $R^2$ are each methyl.

By way of illustration, the terminology "aromatic polycarbonate resin" as employed in this disclosure is meant to include homopolymeric carbonates and copolymeric carbonates, as well as mixtures of the two, in which the polymer or copolymer has a molecular weight (number average) of from about 8,000 to about 200,000 or higher, but preferably from about 10,000 to about 80,000. The preferred polymers will usually be characterized by an intrinsic, i.e., inherent, viscosity within the range from about 0.30 to about 1.0 deciliters per gram (dl/g) as measured in solution in methylene chloride at 25° C. To illustrate further, such polycarbonates may be derived from dihydric phenols such as 2,2-bis(4-hydroxyphenyl)propane; bis(4-hydroxyphenyl)methane; 4,4-bis(4-hydroxyphenyl) heptane. Other suitable dihydric phenols are the non-ring substituted dihydric phenols disclosed in U.S. Pat. Nos. 2,999,835; 3,028,365; 3,334,154; and 4,131,575.

The above-mentioned aromatic polycarbonates can be prepared by use of known processes, such as, for instance, by reacting a dihydric phenol with a carbonate precursor, e.g., phosgene, in accordance with procedures set forth in the patent literature cited above and in U.S. Pat. Nos. 4,108,750 and 4,123,436; or by transesterification processes such as those which are disclosed in U.S. Pat. No. 3,153,008; as well as other processes known to those skilled in the art.

In addition, the aromatic polycarbonates utilized in the present compositions can include polymeric derivatives of a dihydric phenol, a dicarboxylic acid and carbonic acid. A suitable procedure is described in U.S. Pat. No. 3,169,121. Branched polycarbonates, such as disclosed in U.S. 4,001,184, or mixtures of branched and linear polycarbonates may also be employed in the composition.

Also encompassed within the scope of this invention are polycarbonates which have been prepared from two or more different dihydric phenols, or from a copolymer of a dihydric phenol with a glycol or acid terminated polyester, or with a dibasic acid in the event that a carbonate interpolymer or copolymer is desired.

The alkenyl aromatic resin, component (b), is a polymer having at least a portion of its units derived from an alkenyl aromatic monomer such as styrene, α-methylstyrene, p-methylstyrene, tert-butyl styrene, bromo-styrene, chlorostyrene, dimethylstyrene, p-methyl-α-methylstyrene, p-chloro-α-methylstyrene, vinyl xylene, vinyl naphthalene and vinyl toluene.

As indicated, the alkenyl aromatic resin has been modified with a rubber. The term "rubber" as used in this disclosure is meant to encompass both natural and synthetic forms, and to include polyurethane rubber, ethylene/vinyl acetate rubber, silicone rubber, polyether rubber, polypentenamer rubber and ethylene-propylene-diene rubber; diene rubbers, i.e., homopolymers of conjugated dienes having, e.g., 4 to 8 carbon atoms, such as butadiene, isoprene, piperylene and chloroprene; and copolymers of dienes with each other or with styrene, acrylic acid, methacrylic acid, or derivatives thereof (e.g., acrylonitrile, methacrylonitrile, acrylic acid, methacrylic acid, butyl acrylate and methyl methacrylate), or isobutylene. Preferably, the rubber is selected from among butadiene, butadiene/styrene, butadiene/methyl methacrylate, butadiene/butyl acrylate, ethylene/propylene/diene, polypentenamer and butadiene/acrylonitrile rubbers.

Preparation of component (b) may be accomplished by solvent extraction of a conventional rubber modified alkenyl aromatic resin containing particulate rubber. This is carried out by use of a solvent that will dissolve substantially all of the alkenyl aromatic homopolymer resin except for a gel fraction containing the rubber and alkenyl aromatic resin in roughly equivalent or nearly equivalent proportions. Any of a number of organic solvents which yield a gel fraction under suitable process conditions that improves the impact of a polycarbonate may be employed for this purpose, examples of which include acetone, methyl isopropyl ketone and methyl isobutyl ketone. Methyl ethyl ketone is preferred. The insoluble gel fraction or portion is thereafter recovered, washed and dried.

Preferably, the gel fraction should contain no more than about 2 weight percent of free alkenyl aromatic homopolymer.

Special mention is made herein of EPDM rubber modified polystyrene resin. The term "EPDM" is used in the art to designate rubbery interpolymers of a mixture of monoolefins and a polyene. Preferred types for use in the practice of this invention comprise from about 10 to about 90 mole percent of ethylene, from about 10 to about 90 mole percent of an alpha olefin having 3 to 10 carbon atoms, and from about 0.1 to about 10 mole percent of a non-conjugated cyclic or open-chain diene having from 4 to 20 carbon atoms. In the most preferred embodiments, the rubbery interpolymer is derived from ethylene, propylene and a diene selected from 1,4-ethylidene-hexadiene, dicyclopentadiene, and especially, 5-ethylidene-2-norborene.

The alkenyl aromatic resins are well known and are derived from monomers of the formula:

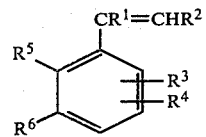

wherein $R^1$ and $R^2$ are selected from the group consisting of lower alkyl of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl of from 1 to 6 carbon atoms or $R^5$ and $R^6$ may be concatenated together with hydrocarbyl groups to form a naphthyl group.

Specific examples of alkenyl aromatic monomers include styrene, chlorostyrene, bromostyrene, alphamethylstyrene, vinyl xylene, vinyl naphthalene and p-methyl styrene.

The alkenyl aromatic resin that is modified with a rubbery interpolymer may be prepared by dissolving the rubbery interpolymer in the alkenyl aromatic monomer and polymerizing the mixture in the presence of a free radical initiator until 90-100% by weight of the alkenyl aromatic monomer has reacted to form said modified alkenyl aromatic resin. These materials are commercially available, such as the product Taflite 925-01 which is a suspension polymerized EPDM modified, high impact polystyrene that contains about 12% of benzene insoluble rubber and the average rubber particle size is about 8-10 microns. The EPDM component appears to be an ethylene-propylene-ethylidene norbornene terpolymer.

Rubber modified polystyrenes containing smaller rubber particles may also be used, such as those described in U.S. Pat. No. 4,101,504 (EPDM rubber particles having a median diameter of less than about 2 microns). Another suitable material is JSR-5, an experimental product manufactured by Japan Synthetic Rubber Co., which is an emulsion graft copolymer of about 50/50 EPDM rubber and styrene.

The preferred modified alkenyl aromatic resins are those made with an EPDM rubbery interpolymer of ethylene, propylene and 5-ethylidene-2-norbornene and styrene. Preferred modified alkenyl aromatic resins will include from about 5 to about 20% by weight of rubbery interpolymer.

A gel suitable for the practice of this invention may be obtained without the necessity of solvent extraction of homopolymer provided the graft copolymer of the alkenyl aromatic resin and EPDM rubber is prepared by a process which yields a product containing about 30-70% of the alkenyl aromatic resin and 70-30% of EPDM rubber, with no more than about 2% of soluble alkenyl aromatic resin homopolymer. Such graft copolymers can be prepared by emulsion graft polymerization.

The emulsion graft copolymer of an alkenyl aromatic resin and a rubbery interpolymer of a mixture of monoolefins and a polyene is preferably based on a rubbery interpolymer that comprises 10-mole percent of ethylene, 10-90 mole percent of an alpha olefin having from 3-10 carbon atoms and from 0.1-10mole percent of a polyene that is a nonconjugated cyclic or open chain diene that has from 5-10 carbon atoms. An especially preferred type of rubbery interpolymer is derived from ethylene, propylene and 5-ethylidene-2-norbornene. The preferred alkenyl aromatic resin is styrene resin. The emulsion graft copolymers may have from 30-60 parts by weight of rubbery interpolymer and from 40-70 parts by weight of alkneyl aromatic resin. These materials are commercially available and one such material was JSR-5, an experimental material which was made by the Japan Synthetic Rubber Co. This product has about 50% EPDM and 50% styrene and has a small rubber particle size (0.1-0.5 microns).

A material suitable as component (b) can also be prepared from the following ingredients using the procedure described below

| INGREDIENTS | PARTS BY WEIGHT |
|---|---|
| Ethylene-propylene-5-ethylidene 2-norbornene (6% solution in N—hexane) | 100 |
| Soap solution (Dresinate 214): potassium salt of disproportionated resin acid, 2 parts; potassium hydroxide, 0.5 part; and water, 100 parts | 102.5 |

The soap and rubber solutions, above, are emulsified in a standard homogenizer and thereafter stripped off with steam. The resulting latex is creamed to remove excess soap by adding 0.5 part of a 1% solution of ammonium alginate in water. The finished latex is adjusted to a 20% solids content. The latex is then graft copolymerized with styrene, in accordance with the procedure as described in further detail in U.S. Pat. No. 3,434,096.

The compositions of the invention comprise from about 80.0 to 98.0 parts by weight of polycarbonate resin and 20.0 –2.0 parts by weight of the gel additive per 100 parts by weight of polycarbonate and gel additive. A preferred range comprises from 90.0 –96.0 parts by weight of polycarbonate and from 4.0 –10.0 parts by weight of gel additive per 100 parts by weight of polycarbonate and gel additive.

In addition to the foregoing, the compositions of this invention can also contain other ingredients, such as additive materials commonly employed to improve the physical and chemical properties of polycarbonate molding compositions. Such additives may be selected from among, for instance, reinforcing agents, including aluminum, iron, nickel or other metals, carbon silicates, such as acicular calcium silicate, acicular calcium sulfate, wallastonite, titanium dioxide, potassium titanate, bentonite, kaolinite, or glass; mineral fillers which do not impart a reinforcing function; stabilizers; antioxidants; pigments, dyes and other coloring agents; mold release agents; processing aids, including melt viscosity reducers, if necessary; and so forth. Amounts from 1 to 50 parts by weight of the total composition weight are typical.

In those cases where flame retardancy is desired, effective amounts of one or more flame retardant agents can be incorporated, usually ranging in amounts from 0.1 to 50 parts by weight per 100 parts of resin. These can be selected from among those materials well known for this purpose.

The compositions can be processed into the molded article by adding each ingredient as part of a blend premix, passing the latter through an extruder or fluxing it on a mill at an elevated temperature sufficient to achieve complete melting and homogeneity, cooling, cutting into pieces and molding into the desired shape.

DESCRIPTION OF THE SPECIFIC EMBODIMENTS

The composition of the invention and methods of its preparation and use are illustrated in the following examples, which are specific embodiments and are not intended as a limitation on the scope.

PROCEDURE A

The gel additive may be obtained from an EPDM modified polystyrene, prepared by U.S. Pat. No. 4,101,504, that contains about 15% by weight of ethylene-propylene-5-ethylidene-2-norbornene. The gel additive may be obtained using the following procedure:

(1) pour 2500 ml of methyl ethyl ketone (MEK) into a stirred flask;

(2) dissolve 300 gms of EPDM polystyrene in the flask and stir the resulting cloudy solution for four hours.

(3) centrifuge the cloudy solution at 2000 rpm, overnight (15–20 hours);

(4) decant the clear MEK solution; the insoluble EPDM/PS gel will appear as a layer of white paste at the bottom of the centrifuge bottle;

(5) re-slurry the white paste with fresh MEK for four hours, then centrifuge at 2000 rpm overnight and decant;

(6) re-slurry the white paste again, with fresh MEK, for two hours, then centrifuge at 2000 rpm for four hours and decant;

(7) re-slurry the white paste with methanol, overnight;

(8) filter the methanol slurry through a coarse fritted glass filter and wash the filter cake several times with fresh methanol;

(9) dry the filter cake overnight in a vacuum oven set at 50° C. and 20 in. -Hg vacuum.

The final dried product is a white, fluffy powder containing EPDM rubber and polystyrene in an approximately 1:1 weight ratio.

EXAMPLES 1–4

The compositions noted below were prepared by extruding the ingredients on a ¾ inch Brabender single screw extruder (lab type), adjusted to a 1:1 compression ratio, chopping the extrudate into pellets, drying the pellets for 4–5 hours in an air circulating oven at 230° F., and injection molding using a 4 ounce Newbury machine and a barrel temperature of 600° F. (190° F. mold temperature).

TABLE

| | 1* | 2** | 3 | 4 |
|---|---|---|---|---|
| Ingredients, Parts by Weight | | | | |
| Polycarbonate of 2,2-bis(4-hydroxyphenyl)propane | 100 | 100 | 100 | 100 |
| Polyethylene | — | 4.3 | — | — |
| Gel (Procedure A) | — | — | 4.3 | 9.6 |
| Phosphite | 0.5 | 0.5 | 0.5 | 0.5 |
| Properties | | | | |
| Notched Izod strength, ft. lbs./in. ⅛ inch specimen | | | | |
| aged at 73° F. | 16 | 14.5 | 17.4 | 16.4 |
| aged at −20° F. | 1.3 | 4.8 | 3.3 | 4.3 |
| Notched Izod strength, ft. lbs./in. ¼ inch specimen | | | | |
| aged at 73° F. | 2.7 | 7.8 | 8.5 | 12.5 |
| aged at −20° F. | 1.2 | 2.8 | 2.2 | 2.3 |
| Gardner strength, in. lbs. | | | | |
| aged at 73° F. | 348 | 295 | 320 | 300 |
| aged at −20° F. | 400 | 386 | >400 | >400 |
| Elongation, % | 93 | 128 | 112 | 104 |
| Tensile yield, psi | 9,000 | 8,400 | 8,500 | 7,500 |
| Tensile break, psi | 8,200 | 9,900 | 9,100 | 8,500 |
| Flexural yield, psi | 14,600 | 13,300 | 12,600 | 12,400 |
| Flexural modulus, psi | 342,000 | 316,000 | 324,000 | 293,000 |
| Heat deflection temp. | 279 | 280 | 276 | 267 |

TABLE-continued

|   | 1* | 2** | 3 | 4 |
|---|---|---|---|---|
| °F. under load at 264 psi | | | | |

*control composition
**comparison composition

As is shown, the room temperature and subzero Izod impact strengths of compositions 3 and 4, according to the invention, are greatly improved for the thicker specimen (¼ inch), in comparison with composition 1 containing no additive. The room temperature Izod strength of composition 3, at ¼ inch thickness, is also noticeably better than that of composition 2, containing polyethylene as the additive. Moreover, the Gardner impact strengths of compositions 3 and 4 are good, as are all of the other properties tested.

Other modifications and variations of the invention are possible in the light of the above disclosure. It is to be understood, therefore, that changes may be made in the particular embodiments shown which are still within the scope of the invention defined in the appended claims.

What is claimed is:

1. A thermoplastic molding composition comprising
   (a) an aromatic polycarbonate resin having repeating units of the formula

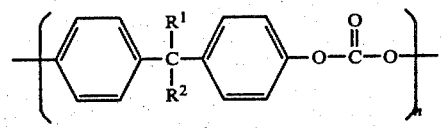

in which $R^1$ and $R^2$ are independently selected from the group consisting of hydrogen, (lower) alkyl of from 1 to about 6 carbon atoms, halogen substituted (lower) alkyl and phenyl, and n represents the total number of monomer units and is at least about 30 the polycarbonate resin of the said composition having virtually no o, o, o', o'-tetraalkyl substituted aromatic units; and
   (b) an Izod impact improving effective amount of a gel material in the form of rubbery particles comprising rubber, rubber grafted alkenyl aromatic resin and occluded alkenyl aromatic resin, the gel material being substantially devoid of solvent extractable alkenyl aromatic homopolymer.

2. A composition according to claim 1, in which $R^1$ and $R^2$ are each methyl.

3. A composition according to claim 1, in which polycarbonate resin (a) has been formed from a starting mixture of a bis(4-hydroxyphenyl)alkane, a carbonate precursor and an aromatic compound having more than two reactive functional groups.

4. A composition according to claim 1, in which the gel material is from a rubbery interpolymer derived from a mixture of monoolefins and a polyene.

5. A composition according to claim 4, in which said mixture comprises from about 10 to about 90 mole percent of ethylene, from about 10 to about 90 mole percent of an alpha olefin containing 3 to 10 carbon atoms, and about 0.4 to about 10 mole percent of a polyene which is a non-conjugated cyclic or open chain diene having from 4 to 20 carbon atoms.

6. A composition according to claim 4, in which the rubbery interpolymer is derived from a mixture of ethylene, propylene, and a diene selected from among 1,4-hexadiene, dicyclopentadiene and 5-ethylidene-2-norbornene.

7. A composition according to claim 4, in which the rubbery interpolymer is derived from a mixture of ethylene, propylene and 5-ethylidene-2-norbornene.

8. A composition according to claim 1, in which the gel material (b) has been produced by contacting a rubber modified high impact alkenyl aromatic homopolymer with a solvent to extract any free alkenyl aromatic resin therefrom, such that the treated material contains no more than about 2 weight percent of free alkenyl aromatic homopolymer.

9. A composition according to claim 1, in which the gel material (b) is from an emulsion graft copolymer of an alkenyl aromatic resin and a rubbery interpolymer.

10. A composition according to claim 1, wherein the alkenyl aromatic resin is polystyrene.

11. A composition according to claim 1, which includes a reinforcing amount of a reinforcing agent.

12. A composition according to claim 1, which includes a flame retardant amount of a flame retardant agent.

13. A method for improving the impact strength of articles molded from a composition containing an aromatic polycarbonate having repeating units of the formula

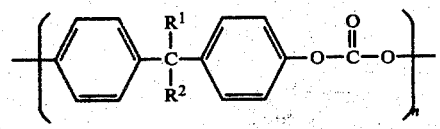

in which $R^1$ and $R^2$ are independently selected from the group consisting of hydrogen, (lower) alkyl of from 1 to about 10 carbon atoms, halogen substituted (lower) alkyl and phenyl, and n is an integer of at least about 30, comprising admixing the polycarbonate with an impact strength improving amount of a gel material in the form of rubbery particles comprising rubber, rubber grafted alkenyl aromatic resin and occluded alkenyl aromatic resin, the gel material being substantially devoid of free alkenyl aromatic homopolymer.

14. A method according to claim 13, in which the gel material is an extract resulting from contacting a rubber modified alkenyl aromatic resin with an organic solvent capable of dissolving substantially all of any free alkenyl aromatic homopolymer therefrom.

15. A method according to claim 14, in which the solvent is an aliphatic ketone or ketones.

16. A method according to claim 14, in which the solvent is methyl ethyl ketone.

17. A method according to claim 13, comprising the additional step of admixing the blend of polycarbonate and gel material with a reinforcing amount of a reinforcing agent.

* * * * *